United States Patent
Röhm

(10) Patent No.: US 6,341,553 B1
(45) Date of Patent: Jan. 29, 2002

(54) CHUCK ACTUATOR WITH PRESSURE SENSOR

(75) Inventor: Günter Horst Röhm, Sontheim (DE)

(73) Assignee: Rohm GmbH, Sontheim (DE)

( * ) Notice: Subject to any disclaimer, the term of this patent is extended or adjusted under 35 U.S.C. 154(b) by 0 days.

(21) Appl. No.: 09/193,709

(22) Filed: Nov. 17, 1998

(30) Foreign Application Priority Data

Nov. 25, 1997 (DE) .......................................... 197 52 084

(51) Int. Cl.⁷ ........................ F01B 31/12; B23B 31/30; B23Q 17/00
(52) U.S. Cl. ........................................ 92/5 R; 279/4.02
(58) Field of Search .............................. 279/4.02; 92/5 R

(56) References Cited

U.S. PATENT DOCUMENTS

| | | | | |
|---|---|---|---|---|
| 4,254,676 A | * | 3/1981 | Wilson | ...................... 279/4.02 |
| 4,536,000 A | * | 8/1985 | Rohm | ......................... 279/110 |
| 4,700,610 A | | 10/1987 | Friedrich et al. | |
| 4,781,390 A | * | 11/1988 | Steinberger et al. | ........ 279/110 |

FOREIGN PATENT DOCUMENTS

| | | |
|---|---|---|
| DE | 34 39 402 C | 4/1986 |
| DE | 40 31 466 C | 7/1991 |
| DE | 44 46 538 A | 6/1996 |
| DE | 195 39 135 | 3/1997 |
| EP | 0 108 857 A2 | 5/1984 |
| EP | 0 180 731 A1 | 5/1986 |

OTHER PUBLICATIONS

Patent Abstract of Japan; vol. 016, No. 573 (M–1344) Dec. 14, 1992; JP 04 223814 (Okuma Mach Works Ltd).; Aug. 13, 1992.

* cited by examiner

*Primary Examiner*—F. Daniel Lopez
(74) *Attorney, Agent, or Firm*—Herbert Dubno; Andrew Wilford

(57) ABSTRACT

A chuck assembly has an actuator cylinder centered on and rotatable about an axis but substantially nondisplaceable relative to the axis, a chuck housing spaced axially from the cylinder, and a tubular connecting shaft extending along the axis and connected fixedly between the cylinder and the chuck housing so that the cylinder, connecting shaft, and chuck housing rotate jointly about the axis but do not move along the axis. A chuck piston axially displaceable in the chuck housing has an inner end turned axially toward the actuator cylinder. An actuator piston is similarly axially displaceable in the cylinder. The two pistons are connected together by a shaft assembly that has an actuator shaft fixed to the actuator piston and having an outer end and a chuck shaft having an inner end connected to the actuator-shaft outer end and an outer end connected to the chuck-piston inner end. A pressure sensor provided between one of the inner ends and the respective outer end detects axial pressure along the shaft assembly.

11 Claims, 4 Drawing Sheets

CHUCK ACTUATOR WITH PRESSURE SENSOR

FIELD OF THE INVENTION

The present invention relates to an actuator for a chuck. More particularly this invention concerns a hydraulic actuator for a lathe chuck.

BACKGROUND OF THE INVENTION

A standard chuck assembly has an actuator cylinder centered on and rotatable about an axis but substantially nondisplaceable relative to the axis and a chuck housing spaced axially from the cylinder. A tubular connecting shaft extending along the axis is connected fixedly between the cylinder and the chuck housing so that the cylinder, connecting shaft, and chuck housing rotate jointly about the axis but do not move along the axis. A chuck piston axially displaceable in the chuck housing has an inner end turned axially toward the actuator cylinder, and an actuator piston axially is displaceable in the cylinder. The chuck piston and actuator piston are axially interconnected by a shaft assembly comprising an actuator shaft fixed to the actuator piston and having an outer end and a chuck shaft having an inner end connected to the actuator-shaft outer end and an outer end connected to the chuck-piston inner end. The chuck has radially displaceable jaws operated by its piston so that a workpiece can be gripped between these jaws and rotated about the axis for machining.

It is important to know how tightly the jaws are squeezing the workpiece. This force is directly related to the axial force the shaft assembly transmits to the chuck piston which is equal to the difference between the pressures in inner and outer compartments flanking the actuator piston. Thus it is relatively simple as described in German patent document 195 39 195 to provide pressure sensors in these compartments or in the hydraulic lines connected to them. The two pressures are read and the difference taken to determine the clamping force.

Such a system is relatively inaccurate. According to the Gaussian theory of error multiplication the measurement errors of the two read-out values are determined by the square root of the sum of the squares of the absolute inaccuracies of the individual measurements. Thus it is clear that the force determined in this manner can be relatively inaccurate.

OBJECTS OF THE INVENTION

It is therefore an object of the present invention to provide an improved chuck assembly.

Another object is the provision of such an improved chuck assembly which overcomes the above-given disadvantages, that is which allows the user to very accurately determine the clamping force.

SUMMARY OF THE INVENTION

A chuck assembly has according to the invention an actuator cylinder centered on and rotatable about an axis but substantially nondisplaceable relative to the axis, a chuck housing spaced axially from the cylinder, and a tubular connecting shaft extending along the axis and connected fixedly between the cylinder and the chuck housing so that the cylinder, connecting shaft, and chuck housing rotate jointly about the axis but do not move along the axis. A chuck piston axially displaceable in the chuck housing has an inner end turned axially toward the actuator cylinder. An actuator piston is similarly axially displaceable in the cylinder. The two pistons are connected together by a shaft assembly that has an actuator shaft fixed to the actuator piston and having an outer end and a chuck shaft having an inner end connected to the actuator-shaft outer end and an outer end connected to the chuck-piston inner end. According to the invention a force sensor provided between one of the inner ends and the respective outer end detects axial force along the shaft assembly.

Thus in accordance with the invention the force is measured right in the shaft assembly transmitting the force from the actuator to the chuck. Since the losses between this shaft and the jaws are inconsequential, the force thus detected very accurately represents the clamping force. There are no cumulative errors; instead a single force reading is taken.

The sensor according to the invention can be between the actuator-shaft outer end and the chuck-shaft inner end. In this situation the chuck-shaft includes an extension piece forming its inner end. Such an installation is particularly suitable as a retrofit. The use of an intermediate piece reduces difficulties in calibrating the assembly.

Alternately the sensor is between the chuck-shaft outer end and the chuck-piston inner end. Putting it right at the chuck ensures that its output will most accurately reflect clamping force.

The chuck assembly according to the invention further has a transmitter axially and rotationally fixed to the cylinder, connecting shaft, and chuck housing, a connecting line between the transmitter and the sensor for outputting axial force detected by the sensor, and a receiver juxtaposed with the transmitter but nonrotatable about the axis for receiving the transmitted force. The transmitter can be mounted on the actuator shaft. In this case the chuck assembly further comprises a distributor body axially fixed but rotatable on an inner end of the actuator shaft and carrying the receiver. The existing fluid bores in the distributor body can be used to run the output lines, so that the system of this invention does not greatly complicate manufacture of the chuck assembly. The transmitter can also be mounted on the cylinder or on the chuck housing.

The sensor in accordance with the invention is piezoelectric or a strain gauge. It can also be a pressure compartment associated with such a pressure detector.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
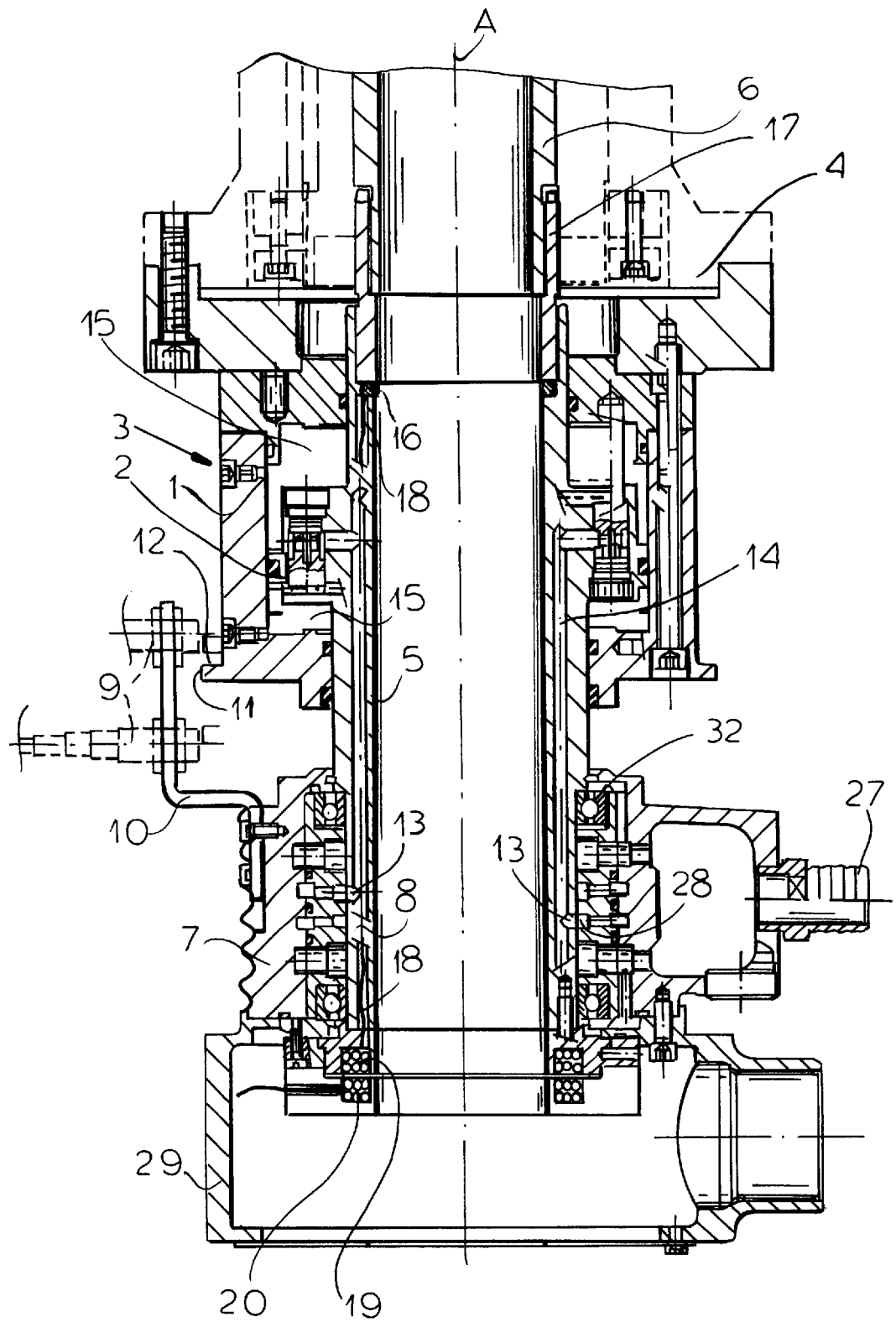
FIG. 1 is a partly diagrammatic axial section through a chuck actuator according to the invention.

As seen in FIG. 1 a chuck actuator according to the invention has a cylinder assembly 3 comprised of a cylinder 1 centered on and rotatable about an axis A but axially nondisplaceable relative to this axis A and containing an axially displaceable piston 2 defining in the cylinder 1 a pair of axially opposite compartments 15. The piston 2 is unitary with a tubular piston shaft 5 that is axially connected to a coaxial chuck-actuating shaft 6 rotatable in a rotatable but axially fixed chuck shaft 4.

A distributor body 7 can rotate via bearings 32 on an inner end 8 of the shaft 5 but is fixed axially thereto. It is provided with an axially extending outrigger-type support 10 carrying a pair of magnetic-type limit switches 9. A surface 12 of a collar 11 formed in the steel cylinder 1 can coact with these sensor switches 9 to indicate the relative axial positions of the shaft elements 5 and 6 and the cylinder 1. A pair of radially outwardly open grooves 13 in the inner shaft end 8 are aligned with radially inwardly open grooves 28 formed in the distributor body 7 and themselves connected to respective fittings 27 (only one shown) that allow them to be alternately pressurized and depressurized. Passages 14 in the tubular shaft 5 connect the grooves 13 to the respective compartments 15 so that, when one of the compartments 15 is pressurized and the other depressurized, the shaft 5, 6 will move axially in one direction relative to the cylinder 1 and chuck shaft 4, and when the pressurization is reversed it will move axially oppositely, as is well known in the art.

According to the invention a force sensor 16 is provided between an outer end of the shaft 5 and an inner end of an extension or intermediate piece 17 threaded to the inner end of the shaft 6. This sensor 16, which can be a strain gauge or of the piezoelectric type, produces an electrical output, typically in the form of resistance proportional to how much it is compressed, that is read or outputted through conductors 18 extending along the shaft 5 to a transmitter coil 19 at the inner end 8 of the shaft 5 inside a leak collector 29 fixed to the nonrotating distributor body 7. A receiver coil 20 mounted on the body 7 is juxtaposed coaxially with the transmitter coil 19 to read the output therefrom.

Figure 2:
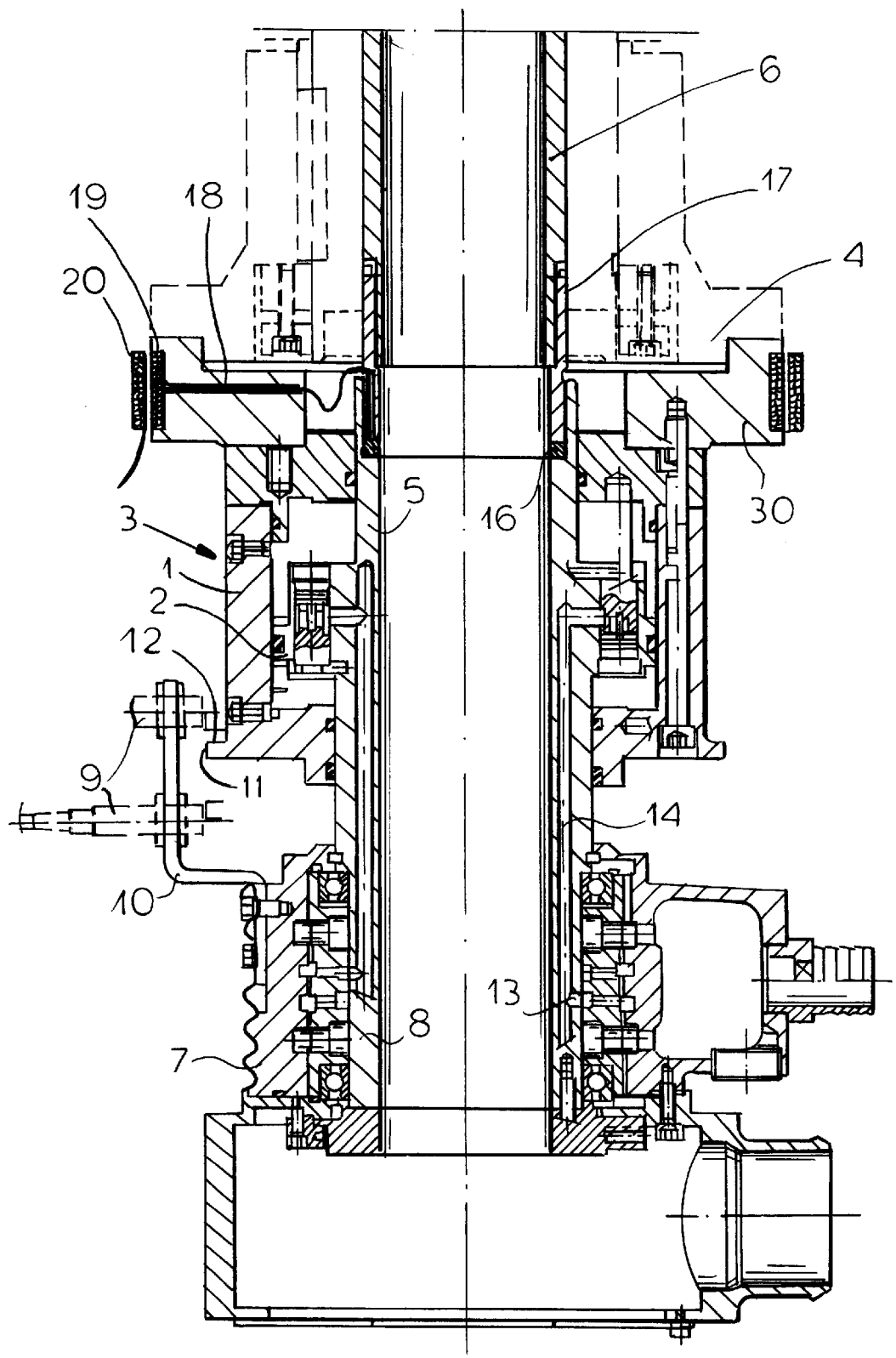
FIG. 2 is a view like FIG. 1 of an alternative actuator in accordance with the invention.

In FIG. 2 the coil 19 is mounted on the inner end of a flange 30 carried on the cylinder 1 and the receiver coil 20 coaxially surrounds it.

Figure 3:
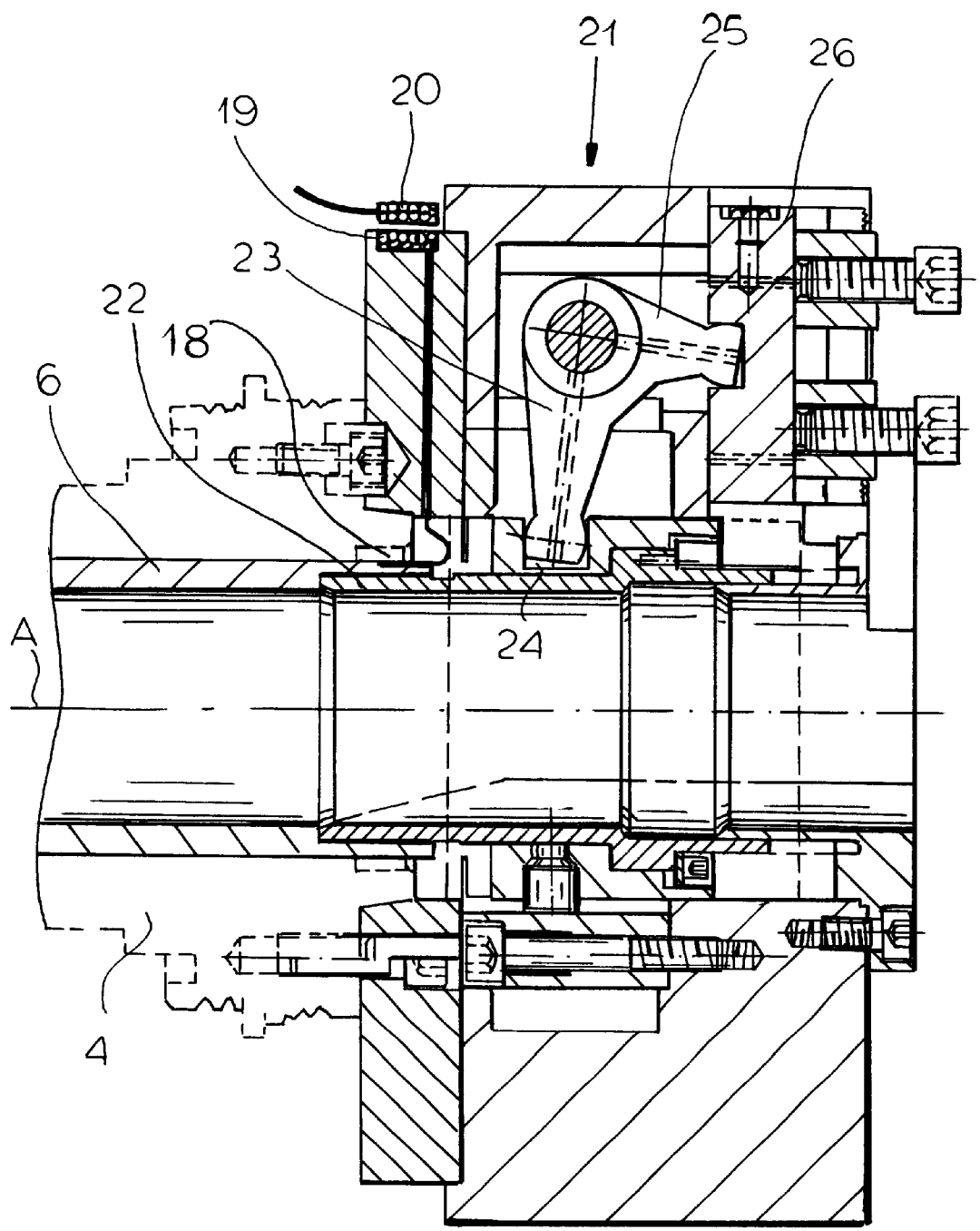
FIG. 3 is an axial section through a chuck according to the invention.

FIG. 3 shows how the axially fixed but rotatable chuck shaft 4 carries a chuck 21 while the actuating shaft 6 fixed axially to the piston shaft 5 is formed with a groove 24 in which engage arms 23 of levers 25 (one shown) whose other arms engage in respective radially displaceable chuck jaws 26. Here the transmitter coil 19 is mounted on the chuck 21 which does not move axially.

Figure 4:
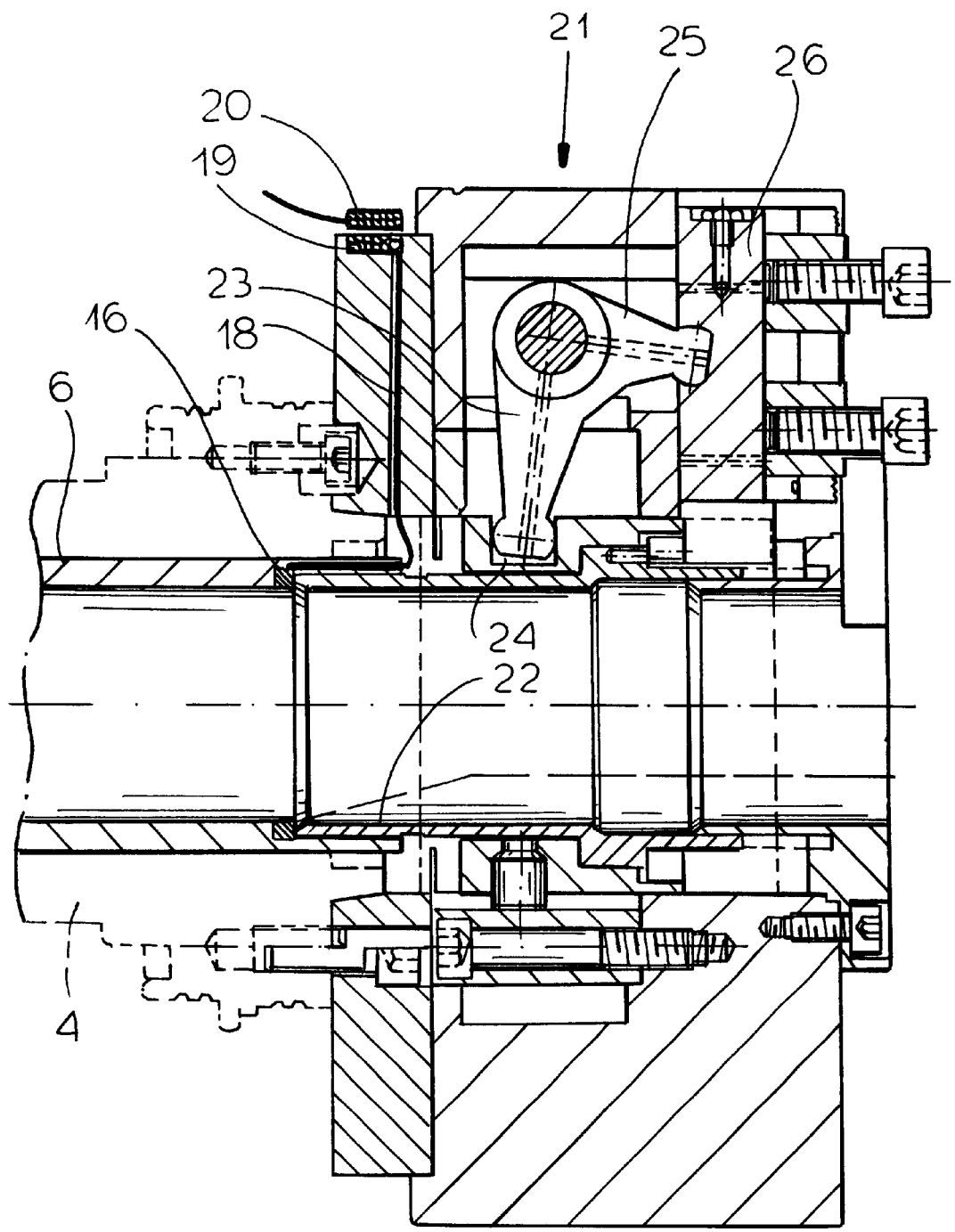
FIG. 4 is a view like FIG. 3 of an alternative chuck in accordance with the invention.

In FIG. 4, where the structure is much the same as in FIG. 3, the force sensor 16 is mounted between the outer end of the chuck-actuating shaft 6 and the inner end of the actual chuck tube shaft 22.

I claim:

1. A chuck assembly comprising:
   an actuator cylinder centered on and rotatable about an axis but substantially nondisplaceable relative to the axis;
   a chuck housing spaced axially from the cylinder;
   a tubular connecting shaft extending along the axis and connected fixedly between the cylinder and the chuck housing, whereby the cylinder, connecting shaft, and chuck housing rotate jointly about the axis but do not move along the axis;
   a chuck piston axially displaceable in the chuck housing and having an inner end turned axially toward the actuator cylinder;
   an actuator piston axially displaceable in the cylinder;
   a shaft assembly comprising an actuator shaft fixed to the actuator piston and having an outer end and a chuck shaft having an inner end connected to the actuator-shaft outer end and an outer end connected to the chuck-piston inner end; and
   means including a force sensor provided between one of the inner ends and the respective outer end for detecting axial force along the shaft assembly, the one inner end bearing axially via the force sensor on the respective outer end so that axial force is transmitted between the pistons via the force sensor.

2. The chuck assembly defined in claim 1 wherein the sensor is between the actuator-shaft outer end and the chuck-shaft inner end.

3. The chuck assembly defined in claim 2 wherein the chuck-shaft includes an extension piece forming its inner end.

4. The chuck assembly defined in claim 1 wherein the sensor is between the chuck-shaft outer end and the chuck-piston inner end.

5. The chuck assembly defined in claim 1, further comprising:
   means including a transmitter axially and rotationally fixed to the cylinder, connecting shaft, and chuck housing and a connecting line between the transmitter and the sensor for outputting axial force detected by the sensor; and
   means including a receiver juxtaposed with the transmitter but nonrotatable about the axis for receiving the transmitted force.

6. The chuck assembly defined in claim 6 wherein the transmitter is mounted on the actuator shaft.

7. The chuck assembly defined in claim 6, further comprising
   a distributor body axially fixed but rotatable on an inner end of the actuator shaft and carrying the receiver.

8. The chuck assembly defined in claim 6 wherein the transmitter is mounted on the cylinder.

9. The chuck assembly defined in claim 6 wherein the transmitter is mounted on the chuck housing.

10. The chuck assembly defined in claim 1 wherein the sensor is piezoelectric.

11. The chuck assembly defined in claim 1 wherein the sensor is a strain gauge.

* * * * *